United States Patent [19]
Labatte et al.

[11] Patent Number: 6,125,392
[45] Date of Patent: *Sep. 26, 2000

[54] METHOD AND APPARATUS FOR HIGH SPEED EVENT LOG DATA COMPRESSION WITHIN A NON-VOLATILE STORAGE AREA

[75] Inventors: Timothy E. Labatte, Portland; Nicholas J. Yoke, Hillsboro, both of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/731,223

[22] Filed: Oct. 11, 1996

[51] Int. Cl.⁷ ..................................................... G06F 11/00
[52] U.S. Cl. ........................... 709/224; 709/300; 707/10
[58] Field of Search ............................. 341/51, 50, 107; 395/209, 497.02, 616, 650, 553, 182.21, 352, 182.04; 371/16.5, 20.1, 21.1; 345/202; 369/900; 375/122; 382/239; 340/347; 364/514, 200; 711/144; 709/300, 224; 707/10; 379/34; 177/210

[56] References Cited

U.S. PATENT DOCUMENTS

| | | | |
|---|---|---|---|
| 4,774,658 | 9/1988 | Lewin | 364/200 |
| 5,245,615 | 9/1993 | Treu | 371/16.5 |
| 5,287,363 | 2/1994 | Wolf et al. | 371/21.1 |
| 5,355,484 | 10/1994 | Record et al. | 395/650 |
| 5,377,196 | 12/1994 | Godlew et al. | 371/20.1 |
| 5,442,146 | 8/1995 | Bell et al. | 177/210 |
| 5,475,732 | 12/1995 | Pester, III | 379/34 |
| 5,512,921 | 4/1996 | Mital et al. | 345/202 |
| 5,627,533 | 5/1997 | Clark | 341/51 |
| 5,666,514 | 9/1997 | Cheriton | 711/144 |
| 5,675,510 | 10/1997 | Coffey et al. | 364/514 |
| 5,692,125 | 11/1997 | Schloss et al. | 395/209 |
| 5,729,223 | 3/1998 | Trissel | 341/51 |
| 5,734,853 | 3/1998 | Hendricks et al. | 395/352 |
| 5,745,693 | 4/1998 | Knight et al. | 709/224 |
| 5,793,943 | 8/1998 | Noll | 395/182.04 |
| 5,857,190 | 1/1999 | Brown | 707/10 |
| 5,867,659 | 2/1999 | Otteson | 709/224 |
| 5,896,524 | 4/1999 | Halstead, Jr. et al. | 395/553 |
| 5,956,475 | 9/1999 | Burchkartt et al. | 395/182.21 |
| 5,964,843 | 10/1999 | Eisler et al. | 709/300 |

OTHER PUBLICATIONS

Automatic Data Compression, B.A.Marron & P.A>D. DeMaine, Communications of ACM, vol. 10, Nov. 1967.

Shift–Register Synthesis & BCH Decoding, J.L.Massey, IEEE, vol. 15, Jan. 1969.

*Primary Examiner*—Le Hien Luu
*Assistant Examiner*—Thong Vu
*Attorney, Agent, or Firm*—Kenyon & Kenyon

[57] ABSTRACT

The present invention is a method and apparatus for providing storage of a significant number of events in a runtime event log without block erases of flash memory, through compression of multiple events within a single event entry. The compression of multiple events within a single log entry allows a significantly higher number of events to be stored within an event log than has heretofore been available, and thus provides more accurate information to a user performing diagnostic work on a computer system.

27 Claims, 3 Drawing Sheets

COMPRESSED FORMAT OF A LOGGED EVENT

A TRADITIONAL FORMAT OF A LOGGED EVENT

COMPRESSED FORMAT OF A LOGGED EVENT

METHOD AND APPARATUS FOR HIGH SPEED EVENT LOG DATA COMPRESSION WITHIN A NON-VOLATILE STORAGE AREA

FIELD OF THE INVENTION

The present invention relates generally to microprocessor-based computing systems, and more particularly to high speed runtime event logging in a microprocessor-based computing system.

BACKGROUND INFORMATION

In microprocessor-based computing systems, critical runtime system events (such as error conditions and status generation) are typically stored in a runtime event log in non-volatile, e.g., flash, memory. The logging of such events is performed by the computer's basic input output system (BIOS).

A significant number of events can be generated during computer system operations. This is particularly true during, for example, debugging operations. Non-volatile memory device space, however, is a precious resource within desktop platforms. The clear or unused space available for system event logging on non-volatile devices is often very limited. In addition, if, e.g., a flash memory is the type of non-volatile memory device employed for event logging, the storage of large amounts of event data using conventional event log data formats often requires block erase operations, which are relatively time-consuming to perform.

The delays inherent in block erase operations during event logging can cause major system problems, as the computer's operating system is stalled while the BIOS logs events. Consequently, if the event logging operations are too slow, the operating system may miss vital timer interrupts and fail.

In order to provide event storage on a typical flash memory device without the risk of operating system timer disruption and thus without the delays inherent in block erase operations, the runtime event log must be limited to the clear or unused space likely to be available on the device. A typical 2 megabyte flash memory device, for example, on a typical desktop personal computer can only afford about 4 kilobytes of space for runtime event log storage. Using traditional runtime event log data formats, this amounts to only about 300 stored events, an insufficient number for most debugging needs.

It is desired, therefore, to provide a runtime event log storage solution which is highly efficient in terms of time and space requirements, i.e., which provides storage for a significant number of runtime events on a typical non-volatile memory device without, e.g., requiring block erases.

SUMMARY OF THE INVENTION

The present invention provides a method and apparatus for storing a significant number of events in a computer system's runtime event log through compression of multiple events within a single event log entry. The first occurrence of a particular event triggers the generation of an entry in the runtime event log. Subsequent occurrences of the same event are tallied in the same event log entry in an event frequency field.

In one embodiment of the present invention, a BIOS-accessible counter is used in conjunction with the log entry event frequency field to provide an even greater event storage capability. In this embodiment, the BIOS-accessible counter increments upon each occurrence of a particular event, and when it reaches a predetermined value (the "event granularity number"), the event frequency field is updated. Consequently, each update of the event frequency field represents multiple occurences of an event.

In a further embodiment of the present invention, a time granularity number is employed. This time value represents a minimum time period between the generation of event log entries for a particular event type, and also represents the maximum time period within which a particular event log entry can be updated. Thus, it ensures that the event log is not flooded with entries of one particular type when the frequency of a particular event is unusually high, and also ensures that stale event entries are not updated in times when the frequency of a particular event is especially low.

In further embodiments of the present invention, event log entries are not updated if the computer system has been reset since the generation of an event log entry, or if an event log entry has already been read.

DETAILED DESCRIPTION

The present invention is a method and apparatus for providing storage of a significant number of events in a runtime event log without block erases of non-volatile memory, through compression of multiple events within a single event entry. Because the need for block erases is obviated, the event log update time provided by the present invention is relatively short. Consequently, the risk of operating system timer disruption during event logging is greatly minimized. The compression of multiple events within a single log entry allows a significantly higher number of events to be stored within an event log than has heretofore been available, and thus provides more accurate information to a user performing diagnostic work on a computer system.

Figure 1A:
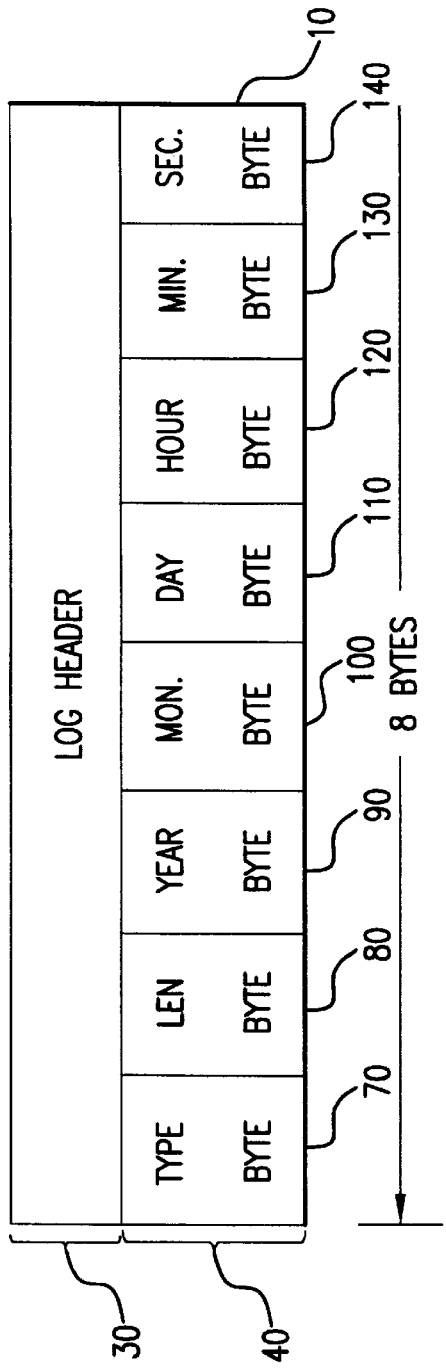
FIG. 1 depicts the traditional and compressed formats of a runtime event log entry.
Figure 1B:
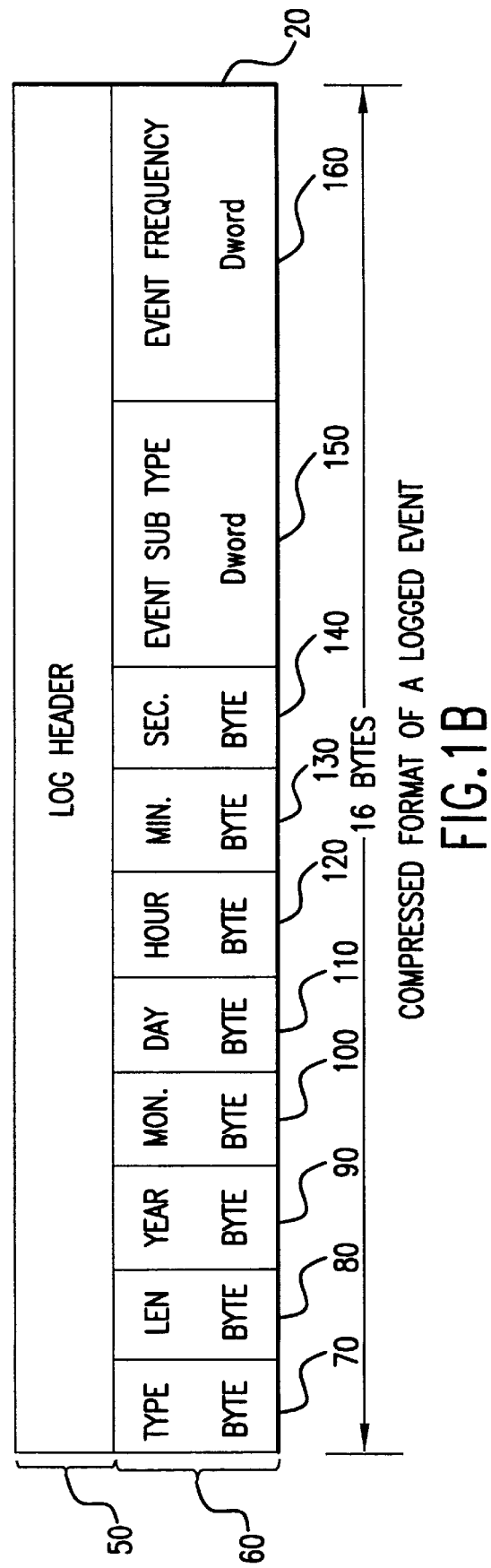

FIG. 1 depicts the traditional format of an event log 10, as well as the compressed format of an event log 20 according to the present invention. An example of a traditional event log 10 is the system event log defined in the Desktop Management Interface (DMI) BIOS specification. Both the traditional 10 and compressed 20 event logs are fixed-length areas within a non-volatile storage element, each including a (vendor-specific) header record 30, 50 followed by one or more log entries 40, 60. The primary difference between the traditional 10 and compressed 20 event logs is the inclusion in the compressed event log 20 of two additional Dwords, 150, 160. The event subtype Dword 150 is used, in conjunction with the event type 70, to describe an event that has occurred. The event frequency Dword 160 is used for storing multiple events within a single log entry 60. System events include, for example, single-bit error correction coding (ECC) memory errors and bus time-outs.

Within both traditional 40 and compressed 60 event log entries, the event type 70 field is used to identify the event by indicating, for example, the category (e.g., ECC memory error) of the event. In the compressed event log entry 60 according to the present invention, an optional event subtype field 150 can be used to more particularly describe the event by indicating, for example, the location (e.g., memory bank 1) of the event.

In traditional event logs 10, a new log entry 40 is created for each event that occurs, regardless of whether a similar event having the same type 70 has already been logged. Thus, traditional event logs 10 can quickly become saturated during debugging or other diagnostic operations which generate a significant number of events.

The present invention allows compression of multiple events within a single event log entry 60 through the use of a data field appended to the end of each log entry. The additional data field is an event frequency field 160, which, in conjunction with a BIOS-accessible counter, keeps a tally of all similar events (i.e., all events with the same type and subtype) that occur within a specified time period.

The event frequency field 160 can contain, e.g., a bitmap or a counter. In one embodiment of the present invention, a bitmap is used in the event frequency field 160 rather than, e.g., a counter, because bitmaps are traditionally more quickly updated than are counters. This is particularly true if the non-volatile memory device employed for event logging is a flash memory device. In flash memory devices, the changing of a single bit from a "0" to a "1" requires the erasing and rewriting of the entire flash memory block containing the bit. However, the converse is not true—that is, A changing a "1" to a "0" requires only rewriting the single bit.

Thus, in an embodiment of the present invention using a flash memory device, a bitmap initialized to all 1's is used in the event frequency field 160 to allow for quick updates of the event log with minimal delays. For a 32-bit bitmap, the initialized value is thus hexadecimal FFFFFFFFh. Following initialization, the event frequency field 160 is updated in this embodiment by toggling each "1" in the bitmap to a "0", starting with the least significant bit.

In one embodiment of the present invention, a BIOS-accessible counter (external to the event log) for each event type/subtype is used in conjunction with the event frequency 160. In this embodiment, the event frequency 160 and the BIOS-accessible counter relating to the particular event type and subtype are initialized when a new event is entered into the log. Thereafter, whenever a similar event occurs, the BIOS-accessible counter is incremented. When the BIOS-accessible counter reaches a predetermined value (the "event granularity number," stored in, e.g., the event log header 50), the event frequency 160 is updated. Updating the event frequency 160 entails, e.g., toggling a bit (if a bitmap is used in the event frequency field 160) or incrementing a counter value (if a counter is used in the event frequency field 160).

Thus, for example, if a bitmap is used in the event frequency field 160, each time the BIOS-accessible counter for a particular event type/subtype reaches the event granularity number, the least significant untoggled bit in the bitmap is toggled from a "1" to a "0." A bitmap wherein each bit is a "0" is thus full, meaning that no further events can be stored within that particular event log entry 60. Each toggled bit in the event frequency field 160 therefore represents n occurrences of a particular event, where n is the event granularity number, stored in the event log header 50. Consequently, the higher the event granularity number, the greater the number of events that can be stored within a given log entry 60 and thus within the event log 20 as a whole.

There is a tradeoff, however, between a high event granularity number and the accuracy of the event data supplied to the user. The BIOS-accessible counter value for each event type/subtype combination is external to the event log. For event occurrence data for a particular event type/subtype, the user has access only to the event log 20, and thus to the event frequency count (e.g., the number of toggled bits multiplied by the event granularity number), which does not include the current value of the BIOS-accessible counter for that event type/subtype. Thus, when the user reads the event log 20, unless the BIOS-accessible counter value for a particular event type/subtype is 0, the occurrence tally the user is given for an event is a truncation of the actual value (the actual value being the event frequency count plus the BIOS-accessible counter value).

The BIOS-accessible counter can be, for example, a hardware counter or a software counter. In one embodiment of the present invention, the counter is a protected, software-based counter stored in RAM (protected in the sense that it is accessible only to the BIOS).

If, for example, system events are likely to occur only infrequently, a BIOS-accessible counter and event granularity number need not be used. In such an embodiment of the present invention, each update of the event frequency field 160, e.g., each toggled bit or counter increment, simply represents a single occurrence of the event.

In an embodiment of the present invention in which protected, software-based BIOS-accessible counters are used, the BIOS-accessible counters for the various event types/subtypes are destroyed when the computer system is shutdown. These BIOS-accessible counters are subsequently reestablished and initialized to 0 upon a system reset, i.e., upon power on or reboot of the system.

In order to ensure that the runtime event log 20 does not become filled with multiple occurrences of one particular event (such as, e.g., thousands of ECC errors), a time granularity number can be employed. The time granularity number (stored in, e.g., the event log header 50) establishes a minimum time period between the creation of an event log entry 60 of a particular event type/subtype, and the creation of a subsequent event log entry 60 of that same type/subtype.

Thus, for example, if the event granularity number is set to 10, and a 32-bit bitmap is used, then a full event log entry represents 320 events. In a situation where, e.g., thousands of a particular ECC error type/subtype occur per minute, the event log can quickly become saturated with these error entries 60. However, if the time granularity number is set to 30 minutes, then an event log entry 60 for these ECC errors will not be generated any more often than every 30 minutes. Thus, any ECC error events of that type/subtype that occur subsequent to the filling of one such event log entry 60 and prior to the expiration of the time granularity number are simply ignored from an event logging perspective.

While the time granularity number can be used to ensure that the event log 20 is not flooded with entries 60 of one particular type when the frequency of a particular event is unusually high, it can also be used to ensure that stale event entries 60 are not updated in times when the frequency of a particular event is especially low. Because each event log entry 60 has only one time associated with it (as represented by the year 90, month 100, day 110, hour 120, minute 130, and second 140 fields), which is the time the entry was initially logged, any subsequent occurrences of that particular event which are compressed into that log entry 60, via the BIOS-accessible counter and event frequency field 160, also become associated with that same time. Thus, it may be desirable to log a new entry 60 for subsequent occurrences of an event for which the previous log entry 60 is stale.

For example, if a logged event entry 60 has a time of 3:00:00 on Thursday, Sep. 19, 1996, and a subsequent occurrence of that event takes place on Thursday, Sep. 26, 1996, it may be desirable to log a new event entry 60 for the subsequent occurrence, even if the event frequency field 160 in the earlier log entry 60 is not completely filled, so that the time associated with the subsequent occurrence more accurately represents the actual time of the event.

Figure 2:
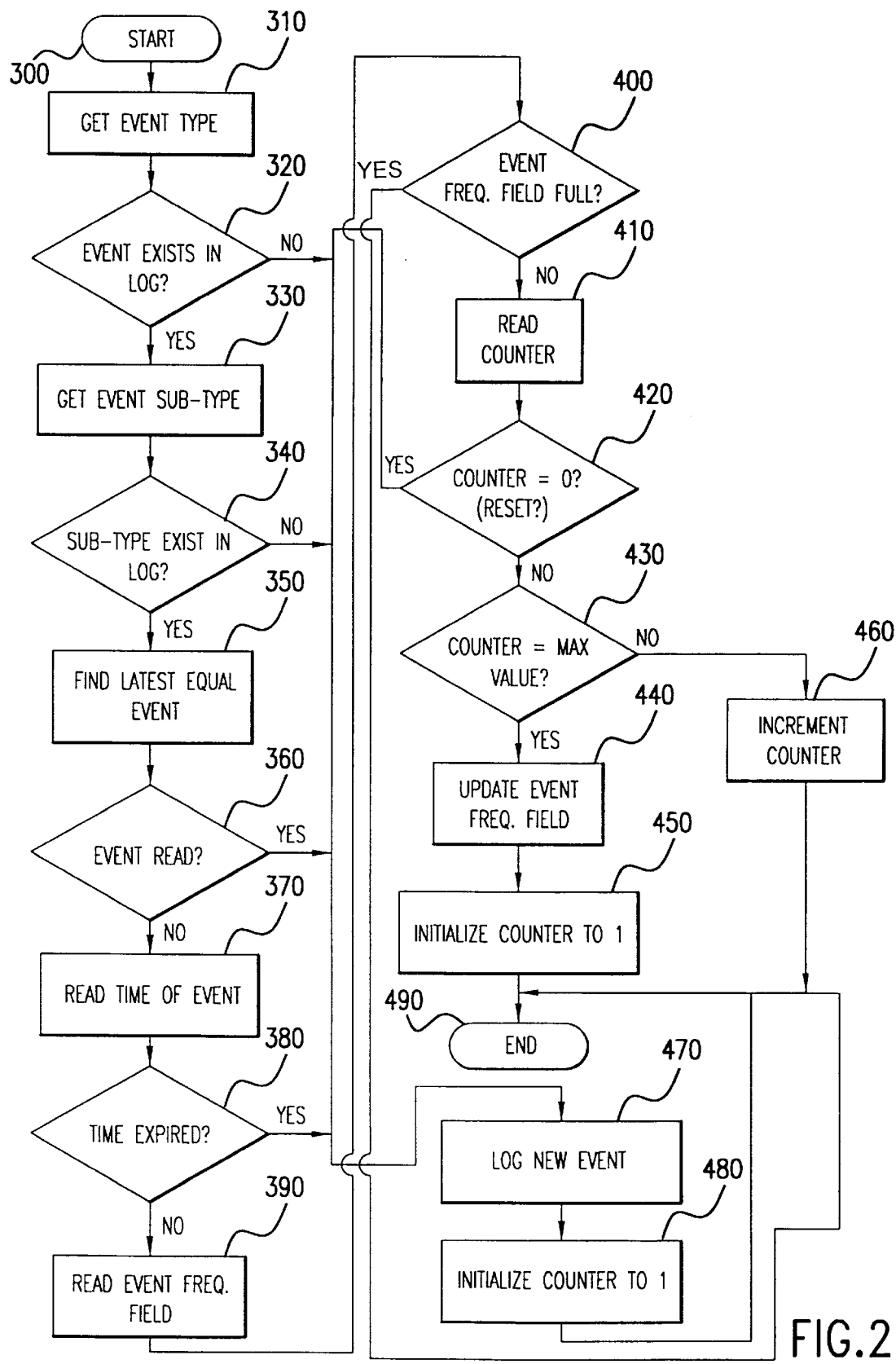
FIG. 2 is a flowchart depicting a high speed, compressed event data logging method according to the present invention.

FIG. 2 is a flowchart depicting the high speed event log data compression method according to the present invention. In one embodiment of the present invention, the method depicted in FIG. 2 is performed by a BIOS program, stored within a computer system's RAM and executed by a microprocessor.

The method of FIG. 2 is initiated (step 300) upon the occurrence of a system event. The type of the system event is discerned (step 310) and a check of the runtime event log is made to determine whether an entry of this event type exists (step 320). If no such event type is found in the event log, then a new event entry is created (step 470), the BIOS-accessible counter corresponding to the event type/subtype is incremented from 0 (its value after reset) to 1 (step 480), and the event compression process is concluded (step 490).

If, in step 320, an event of the present event type is found in the runtime event log, then the event subtype of the present event is determined (step 330). The event log is then checked to determine whether any of the event entries having the present event type also have this event subtype (step 340). If an event of this subtype is not found, then a new event entry is created (step 470), the BIOS-accessible counter corresponding to this event type/subtype is incremented from 0 (its value after reset) to 1 (step 480), and the event compression process is concluded (step 490).

If, in step 340, the subtype of the present event is found in the log, then the log is checked to determine the most recent event entry having this event type and subtype (step 350). This entry is then checked to determine whether it has been read (step 360). If an entry in the event log has already been read, then the event frequency field within that entry is not updated, because higher-level software processes often ignore previously read, i.e., previously accessed (and thus previously-processed), event entries when reading the event log. Thus, a new event entry is created (step 470), the BIOS-accessible counter corresponding to this event type/subtype is incremented from 0 (its value after reset) to 1 (step 480), and the event compression process is concluded (step 490).

In an exemplary embodiment of the present invention, in which a DMI format event log is used, the determination of whether an event entry has been previously read is made by reading the most significant bit (MSB) of the length field 80, e.g., as a status bit. Pursuant to the DMI BIOS specification, this bit specifies whether (MSB=0) or not (MSB=1) the event entry has been read.

If, in step 360, it is determined that the event entry has not previously been read, then the time (i.e., the year 90, month 100, day 110, hour 120, minute 130 and second 140) fields within the event entry are read (step 370) and compared with the current time. If the current time is later than the event entry's time plus the time granularity number (stored in the event log header), then the event entry is deemed stale, a new event entry is created (step 470), the BIOS-accessible counter corresponding to this event type/subtype is incremented from 0 (its value after reset) to 1 (step 480), and the event compression process is concluded (step 490).

If the event entry is not stale, then the event entry's frequency field is read (step 390). If the event frequency field is full (e.g., all "1's" in the bitmap have been toggled to "0's" in an embodiment employing a bitmap initialized to FFFFFFFFh, or the counter has reached its maximum value in an embodiment employing a counter), then the event compression process is concluded (step 490), because, as was determined in step 380, the minimum time (dictated by the time granularity number) between logging of entries of a particular event has not elapsed.

If the event entry's frequency field is not full, then the BIOS-accessible counter corresponding to the particular event type/subtype is read (step 410). If the BIOS-accessible counter indicates a reset status, i.e., the counter has a value of 0 which indicates that the computer system has been reset since the generation of the event log entry (step 420), then a new event entry is created (step 470), the BIOS-accessible counter corresponding to this event type/subtype is incremented from 0 (its value after reset) to 1 (step 480), and the event compression process is concluded (step 490). The reason a new event entry is logged in cases where a system reset has occurred after creation of the existing event entry, is because pre-reset event entries are often no longer relevant since, e.g., the reason for the reset may have been the correction of an error condition which caused the prior events.

If the computer system has not been reset since generation of the event log entry, then the BIOS-accessible counter value for the particular event type/subtype is checked (step 430). If the BIOS-accessible counter value has reached its maximum (i.e., the event granularity number), then the event frequency field is updated (e.g., the least significant untoggled bit of the event entry's bitmap is toggled from a 1 to a 0, or the counter value is incremented), and the BIOS-accessible counter value is reset to 1 (step 450). The compression process is then concluded (step 490).

If, in step 430, the BIOS-accesible counter value is not equal to its maximum, then the BIOS-accessible counter value is incremented (step 460), and the compression process is concluded (step 490).

Figure 3:
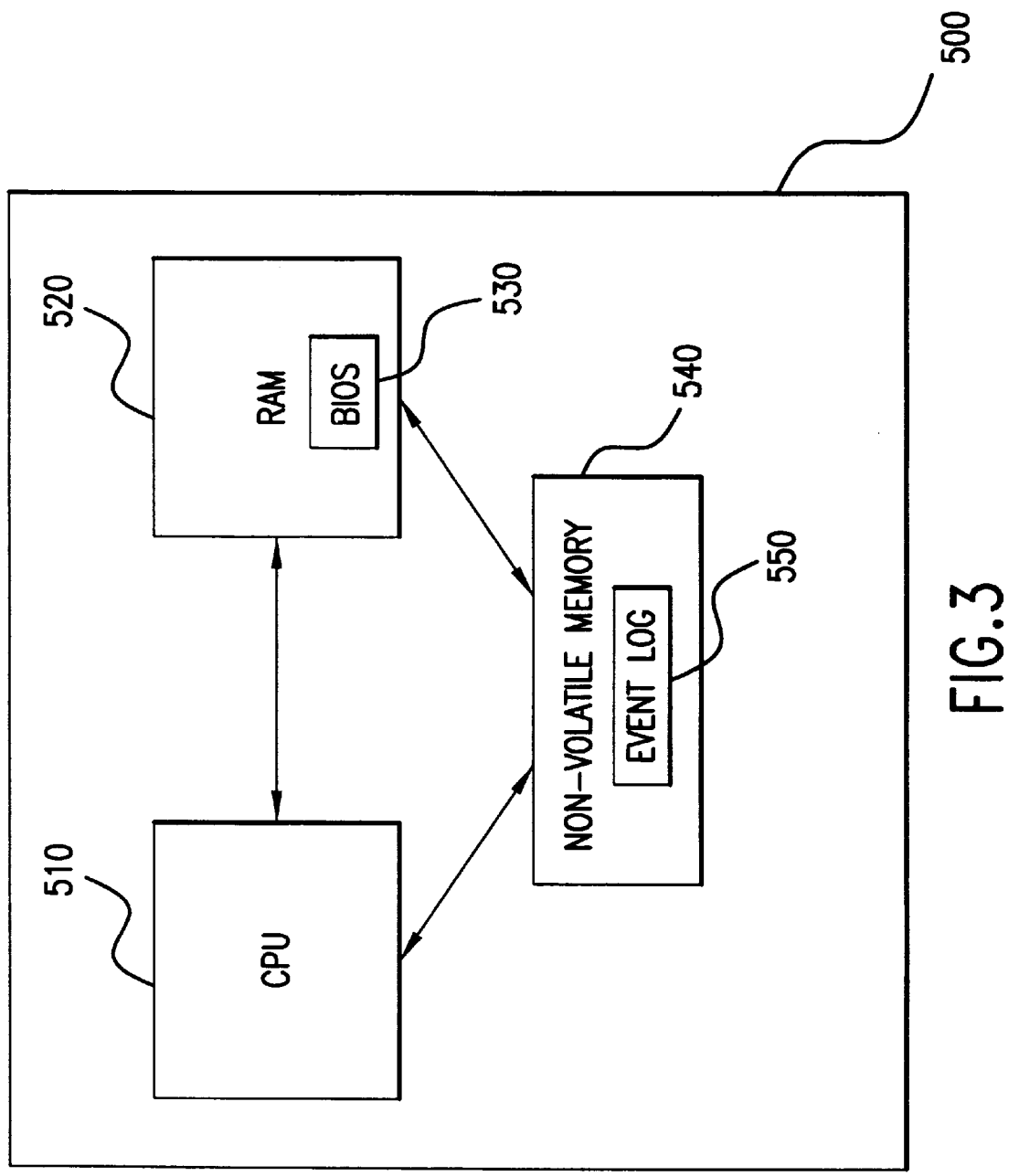
FIG. 3 depicts a microprocessor-based computing system according to the present invention.

FIG. 3 depicts a microprocessor-based computing system 500 according to the present invention. The BIOS program 530 stored in RAM 520 provides the capability for performing the event logging method depicted in the flowchart of FIG. 2. The microprocessor 510 executes the event logging program, and the event log 550 is stored in the computing system's non-volatile, e.g., flash, memory device 540. In an embodiment of the present invention employing a BIOS-accessible counter, the BIOS-accessible counter is stored in, e.g., the RAM 520.

The present invention provides a much greater event storage capability within a runtime event log than has heretofore been available. If the event granularity number is set to, e.g., 10, then approximately 82,000 events can be stored within the same non-volatile memory space capable of recording only 300–400 events using conventional event logging capabilities.

What is claimed is:

1. A method of compressing multiple system events, generated during a computer system's operation, within an event log capable of storing a plurality of event log entries, each event log entry having an event frequency field capable of being updated and a status bit having one of a "read" or a "not read" value, each system event having an event type, the method comprising the steps of:

(A) storing a first event log entry in the event log upon the occurrence of a first system event having a first event type;

(B) upon the occurrence of a second system event having the first event type and the status bit in the event log entry having a "not read" value, updating the event frequency field of the first event log entry, wherein the updated event frequency field represents multiple occurrences of the first event type; and (C) upon the occurrence of a second system event having the first event type, if the status bit in the event log entry has a "read" value, indicating that the event log entry has been previously accessed, storing a second event log entry in the event log.

2. A method of compressing multiple system events, generated during a computer system's operation, within an event log capable of storing a plurality of event log entries, each event log entry having an event frequency field capable of being updated and an associated reset status having one of a "reset" or "not reset" value, each system event having an event type, the method comprising the steps of:

(A) storing a first event log entry in the event log upon the occurrence of a first system event having a first event type;

(B) upon the occurrence of a second system event having the first event type and the reset status having a 'not reset' value, updating the event frequency field of the first event log entry, wherein the updated event frequency field represents multiple occurrences of the first event type; and (C) upon the occurrence of a second system event having the first event type, if the reset status has a "reset" value, storing a second event log entry in the event log.

3. A method of compressing multiple system events, generated during a computer system's operation, within an event log capable of storing a plurality of event log entries, each event log entry having an event frequency field capable of being updated, each event frequency field containing a bitmap having a plurality of bits, each system event having an event type, the method comprising the steps of:

(A) storing a first event log entry in the event log upon the occurrence of a first system event having a first event type; and (B) upon the occurrence of a second system event having the first event type, updating the event frequency field by toggling a bit in the bitmap, wherein subsequent occurrences of the same event are tallied in the same event log entry in the event frequency field.

4. A method of compressing multiple system events, generated during a computer system's operation, within an event log capable of storing a plurality of event log entries, each event log entry having an event frequency field capable of being updated, each event frequency field containing a counter, each system event having an event type, the method comprising the steps of:

(A) storing a first event log entry in the event log upon the occurrence of a first system event having a first event type; and (B) upon the occurrence of a second system event having the first event type, updating the event frequency field by incrementing the counter, wherein subsequent occurrences of the same event are tallied in the same event log entry in the event frequency field.

5. A method of compressing multiple system events, generated during a computer system's operation, within an event logging system having an event log and a counter, the counter having a counter value and an associated event granularity number, the event log being capable of storing a plurality of event log entries, each event log entry including an event frequency field, each event frequency field including a bitmap having a plurality of bits, each system event having an event type, the method comprising the steps of:

(A) storing a first event log entry in the event log upon the occurrence of a first system event having a first event type;

(B) upon the occurrence of a second system event having the first event type, incrementing the counter value; and (C) when the counter value is equal to the event granularity number, updating the event frequency field of the first event log entry by toggling a bit in the bitmap, wherein the updated event frequency field represents multiple occurrences of the first event type.

6. The method of claim 5 wherein the counter is BIOS-accessible.

7. The method according to claim 5, wherein the event log has an associated time granularity number and wherein each event log entry further includes a time field, the method further comprising the steps of:

(D) storing a time value, indicating the time of the first system event's occurrence, in the time field of the first event log entry;

(E) upon the occurrence of a third system event having the first event type, determining whether the current time is later than the time granularity number added to the time value in the time field of the first event log entry; and (F) if the current time is later than the sum of the time granularity number and the time field of the first event log entry, storing a second event log entry in the event log.

8. The method according to claim 5, wherein the bitmap has an associated status having one of a "filled" or "unfilled" value, the method further comprising the steps of:

(D) upon the occurrence of a third system event having the first event type, determining whether all of the plurality of bits in the bitmap in the event frequency field of the first event log entry have been toggled and, if so, assigning a "filled" status to the bitmap in the event frequency field of the first event log entry; and (E) if the bitmap in the event frequency field of the first event log entry has a "filled" status, storing a second event log entry in the event log.

9. The method according to claim 5, wherein the bitmap has an associated status having one of a "filled" or "unfilled" value, the event log has an associated time granularity number, and each event log entry further includes a time field, the method further comprising the steps of:

(D) storing a time value in the time field of the first event log entry;

(E) upon the occurrence of a third system event having the first event type:

(1) determining whether all of the plurality of bits in the bitmap in the event frequency field of the first event log entry have been toggled and, if so, assigning a "filled" status to the bitmap in the event frequency field of the first event log entry, and (2) determining whether the current time is later than the time granularity number added to the time value in the time field of the first event log entry; and (F) if the current time is later than the sum of the time granularity number and the time field of the first event log entry and if the bitmap in the event frequency field of the first event log entry has a "filled" status, storing a second event log entry in the event log.

10. A method of compressing multiple system events, generated during a computer system's operation, within an event logging system having an event log and a first counter, the first counter having a first counter value and an associated event granularity number, the event log being capable of storing a plurality of event log entries, each event log entry including an event frequency field, each event frequency field including a second counter having a second counter value, each system event having an event type, the method comprising the steps of:
- (A) storing a first event log entry in the event log upon the occurrence of a first system event having a first event type;
- (B) upon the occurrence of a second system event having the first event type, incrementing the first counter value; and
- (C) when the counter value is equal to the event granularity number, updating the event frequency field of the first event log entry by incrementing the second counter value, wherein the updated event frequency field represents multiple occurrences of the first event type.

11. The method of claim 10 wherein the counter is BIOS-accessible.

12. The method according to claim 10, wherein the event log has an associated time granularity number and wherein each event log entry further includes a time field, the method further comprising the steps of:
- (D) storing a time value, indicating the time of the first system event's occurrence, in the time field of the first event log entry;
- (E) upon the occurrence of a third system event having the first event type, determining whether the current time is later than the time granularity number added to the time value in the time field of the first event log entry; and
- (F) if the current time is later than the sum of the time granularity number and the time field of the first event log entry, storing a second event log entry in the event log.

13. A system for logging events in a microprocessor-based computing device, comprising:
- a storage medium in the computing device capable of storing an event log and having a program for storing a first event log entry in the event log upon the occurrence of a first event having a first event type, wherein each event log entry has an event frequency field and each event frequency field includes a bitmap having a plurality of bits, and, upon the occurrence of a second event having the first event type, recording the second event in the first event log entry and updating the event frequency field of the first event log entry by toggling a bit in the bitmap, wherein subsequent occurrences of the same event are tallied in the same event log entry in the event frequency field.

14. The event logging system according to claim 13, wherein the storage medium is a solid-state memory.

15. The event logging system according to claim 13, wherein the storage medium is comprised of a random access memory for storing the program and a non-volatile memory for storing the event log.

16. A system for logging events in a microprocessor-based computing device, comprising:
- a storage medium in the computing device capable of storing an event log and having a program for storing a first event log entry in the event log upon the occurrence of a first event having a first event type, wherein each event log entry has an event frequency field and each event frequency field includes a counter, and, upon the occurrence of a second event having the first event type, recording the second event in the first event log entry and updating the event frequency field of the first event log entry by incrementing the counter, wherein subsequent occurrences of the same event are tallied in the same event log entry in the event frequency field.

17. The event logging system according to claim 16, wherein the storage medium is a solid-state memory.

18. The event logging system according to claim 16, wherein the storage medium is comprised of a random access memory for storing the program and a non-volatile memory for storing the event log.

19. A computer system, comprising:
- (A) a memory for storing a program and an event log having a plurality of event log entries, the program capable of storing a first event log entry in the event log upon the occurrence of a first event having a first event type, wherein each event log entry has an event frequency field and each event frequency field includes a bitmap with a plurality of bits, and, upon the occurrence of a second event having the first event type, recording the second event in the first event log entry and updating the event frequency field of the first event log entry by toggling a bit in the bitmap, wherein subsequent occurrences of the same event are tallied in the same event log entry in the event frequency field; and
- (B) a processor, coupled to the memory, for executing the program.

20. The computer system according to claim 19, wherein the program is a BIOS.

21. The computer system according to claim 19, wherein the memory is comprised of a random access memory for storing the program and a non-volatile memory for storing the event log.

22. The computer system according to claim 19, wherein the non-volatile memory is a flash memory.

23. A computer system, comprising:
- (A) a memory for storing a program and an event log having a plurality of event log entries, the program capable of storing a first event log entry in the event log upon the occurrence of a first event having a first event type, wherein each event log entry has an event frequency field and each event frequency field includes a counter, and, upon the occurrence of a second event having the first event type, recording the second event in the first event log entry and updating the event frequency field of the first event log entry by incrementing the counter, wherein subsequent occurrences of the same event are tallied in the same event log entry in the event frequency field; and
- (B) a processor, coupled to the memory, for executing the program.

24. The computer system according to claim 22, wherein the program is a BIOS.

25. The computer system according to claim 22, wherein the memory is comprised of a random access memory for storing the program and a non-volatile memory for storing the event log.

26. The computer system according to claim 22, wherein the non-volatile memory is a flash memory.

27. A method of compressing multiple system events, generated during a computer system's operation, within an event log capable of storing a plurality of event log entries, each event log entry having an event frequency field, each event frequency field including a bitmap having a plurality of bits, each system event having an event type and an event subtype, the method comprising the steps of:
- (A) storing a first event log entry in the event log upon the occurrence of a first system event having a first event type and a first event subtype; and (B) upon the occurrence of a second system event having the first event type and first event subtype, updating the event frequency field of the first event log entry by toggling a bit in the bitmap, wherein subsequent occurrences of the same event are tallied in the same event log entry in the event frequency field.

* * * * *

UNITED STATES PATENT AND TRADEMARK OFFICE
CERTIFICATE OF CORRECTION

PATENT NO.    : 6,125,392
DATED         : September 26, 2000
INVENTOR(S)   : Timothy E. Labatte and Nicholas J. Yoke Page 1 of 1

It is certified that error appears in the above-identified patent and that said Letters Patent is hereby corrected as shown below:

Column 2,
Line 3, "occurences" should be -- occurrences --

Column 3,
Line 24, "A" should be removed

Column 6,
Line 33, "accesible" should be -- accessible --

Column 10,
Lines 50, 52, 56, "22" should be -- 23 --

Signed and Sealed this

Eleventh Day of September, 2001

Attest:

NICHOLAS P. GODICI
*Attesting Officer*           *Acting Director of the United States Patent and Trademark Office*